United States Patent [19]
Park

[11] Patent Number: 5,306,048
[45] Date of Patent: Apr. 26, 1994

[54] ATLAS PROVIDED WITH COLORED INDEXES

[76] Inventor: Se Joon Park, Sadang 3-dong, Tongjak-gu, Seoul, Rep. of Korea

[21] Appl. No.: 29,071

[22] Filed: Mar. 10, 1993

[30] Foreign Application Priority Data

Mar. 23, 1992 [KR] Rep. of Korea .................. 1992-4589

[51] Int. Cl.5 .......................................... G09B 29/00
[52] U.S. Cl. .................................................. 283/35
[58] Field of Search .................... 283/34, 35, 36, 37, 283/38, 41, 42; 281/15.1; 434/150, 153; 40/904

[56] References Cited

U.S. PATENT DOCUMENTS

| | | | |
|---|---|---|---|
| 1,642,616 | 9/1927 | Luginbuhl | 283/35 |
| 1,755,742 | 4/1930 | Mattenklott | 283/35 |
| 2,280,874 | 4/1942 | Yonaka | 283/38 |
| 2,680,630 | 6/1954 | Machol | 283/38 |
| 5,160,170 | 11/1992 | Ferra | 283/35 |

Primary Examiner—Mark Rosenbaum
Assistant Examiner—Willmon Fridie, Jr.
Attorney, Agent, or Firm—Townsend and Townsend Khourie and Crew

[57] ABSTRACT

An atlas prominently discriminating pages to be desired from the other pages by differently colored indexes and allowing the user to look up a place to be desired therein more simply and rapidly. This atlas has a front cover having a regional name section and a plurality of cover index blocks. The cover index blocks indicates the individual maps and is colored in different colors. The inner papers of this atlas is provided with front index blocks and back index blocks. These front and back index blocks align with the cover index blocks and are printed with alphabets representing names of subdivided districts and colored in the same colors as those of the cover index blocks. In coloring the front and back index blocks, one of the front index blocks and one of the back index blocks, which correspond to a district represented by a map, are colored in a deep color while the other front and back index blocks are colored in light colors, thereby causing the pages on which a map to be desired is printed to be distinguishable from the other pages by the tones of colored indexes when this atlas is opened.

2 Claims, 4 Drawing Sheets

ATLAS PROVIDED WITH COLORED INDEXES

BACKGROUND OF THE INVENTION

1. Field of the Invention

The present invention relates in general to an improvement of an atlas or a combined pocketbook-atlas, and more particularly to an atlas which is provided with differently colored indexes at its front cover and inner papers printed with individual maps, thereby allowing the user to easily look up a place to be desired therein owing to tones of a color.

2. Description of the Prior Art

Known pocketbook generally consists of front and back covers and inner papers. The surfaces of individual inner papers are partitioned by drawing horizontal and vertical lines and, as a result, provide a plurality of rectangular blanks in which names, telephone numbers, addresses and the others may be entered. These inner papers are further provided with serial page numbers. Additionally in order to facilitate looking for a page to be desired of the pocketbook, the known pocketbook uses its first page as an index page including the table of contents.

On the other hand, a conventional atlas includes inner papers printed with maps, such as a map of the world and detailed maps of countries and regions, drawn on optionally reduced scales. The maps of the conventional atlas are marked with longitudes, latitudes and direction expressions. In the similar manner to the known pocketbooks, this conventional atlas generally uses its first inner page as an index page.

As described above, the known pocketbook and the known atlas generally include individual indexes provided at their index pages or the first inner pages. On these index pages, tables of contents are provided by printing contents and their page numbers. In accordance with another embodiment of the prior art, stepped or thumb indexes are provided at side peripheries of the inner papers and printed with letters, such as alphabets, for facilitating looking for a page to be desired.

Accordingly, when the user intends to look up an entered information or a place in the known pocketbook or the known atlas, it is required to refer to, in order to recognize the page number of the information or the place to look up, the index prior to finding his place in the pocketbook or in the atlas. Indeed, when the user intends to look up information or place in the known pocketbook and atlas during looking up another information or place, he should return to the index page so as to recognize the desired page number and, thereafter, find his place in the pocketbook or in the atlas. Hence, a disadvantage of the known pocketbook or the known atlas is resided in that, in order to look up different two or more entered information or places, the user should repeatedly consult the table of content of the index page and, thereafter, find the desired pages separately. Furthermore, in the case of driver, he should suspend the driving of the car before he consults the known atlas. To provide stepped or thumb indexes for the known pocketbook and the known atlas involves additional capital investment for manufacture of such indexes. These known stepped or thumb indexes are easily damaged by being folded or worn-out according to long time use and this spoils the beauty of the pocketbook and the atlas.

In an effort to solve the aforementioned disadvantages, the present applicant proposed "Atlas Provided With Distance Measuring Lines" in Korean Utility Model No. 62214. The maps of this atlas are partitioned by horizontal and longitudinal distance measuring lines in addition to latitudes and longitudes and provided with an additional symbolized index and, as a result, allows the user to look up a desired place in the atlas more rapidly. However, this atlas, while reducing the time to be required to look up one place therein, nevertheless relies on, like the other prior embodiments, repeated consulting of the index and repeated finding of desired pages when it is required to look up different two places in the atlas.

SUMMARY OF THE INVENTION

It is, therefore, an object of the present invention to provide an atlas in which the above disadvantages can be overcome and which allows, particularly when different two or more entered information or places are required to be looked for, the user to consult it more simply and rapidly by virtue of pages indexes provided on its front cover and front and back indexes provided on individual inner papers.

It is another object of the present invention to provide an atlas which is provided with page indexes on its front cover and front and back indexes on individual inner papers, the page indexes and front and back indexes being colored in light and deep colors, thereby prominently discriminating pages to be desired from the other pages by the tones of the differently colored indexes and, in this regard, allowing the user to look up a place to be desired therein more simply and rapidly.

In accordance with a preferred embodiment of the present invention, the aforementioned objects can be accomplished by providing an atlas comprising a front cover having a regional name section and page indexes and a plurality of inner papers having individual front and back indexes, said page indexes and front and back indexes being colored in different colors in such a manner that one of the front index blocks and one of the back index blocks, which correspond to a district represented by a map, are colored in a deep color while the other front and back index blocks are colored in light colors.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figures 1, 1A:
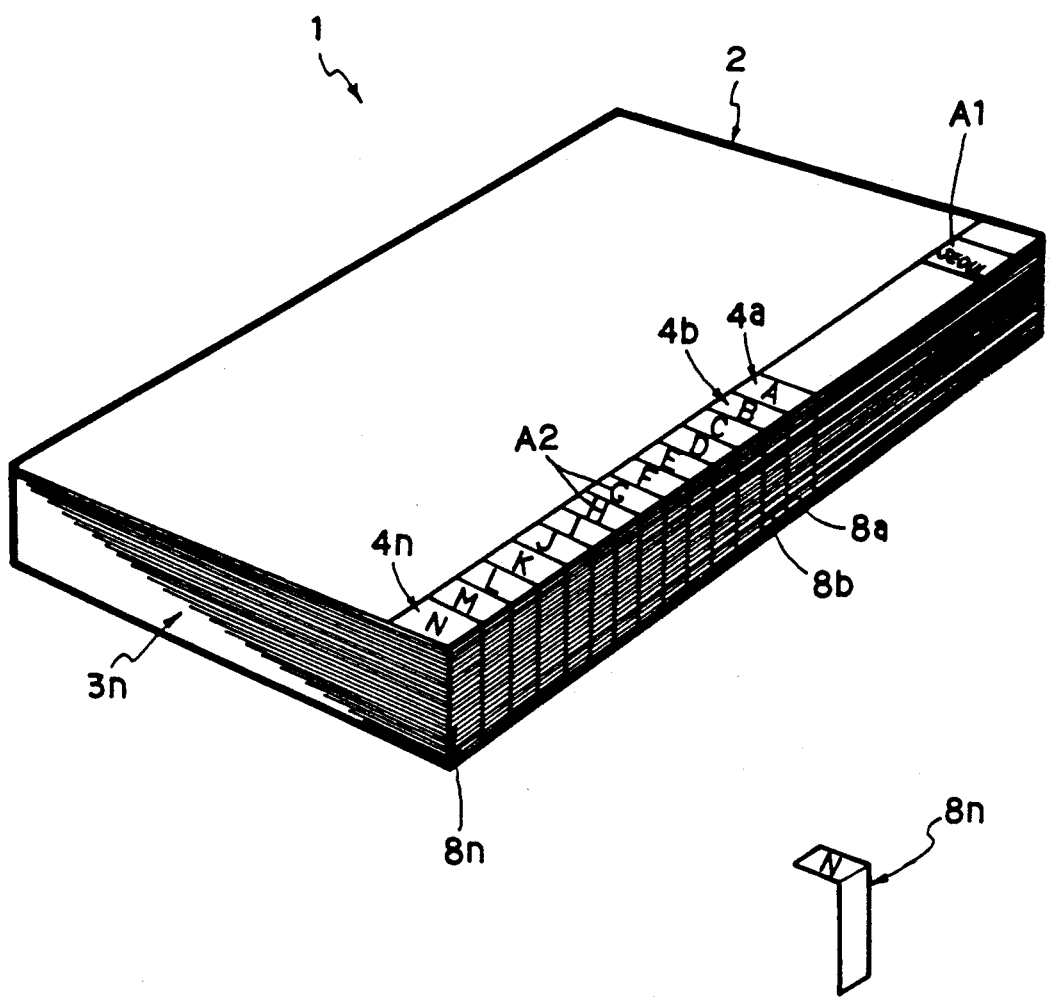
FIG. 1 is a perspective view of an atlas in accordance with an embodiment of this invention.
FIG. 1A is a perspective view of a colored index block.
Figure 2:
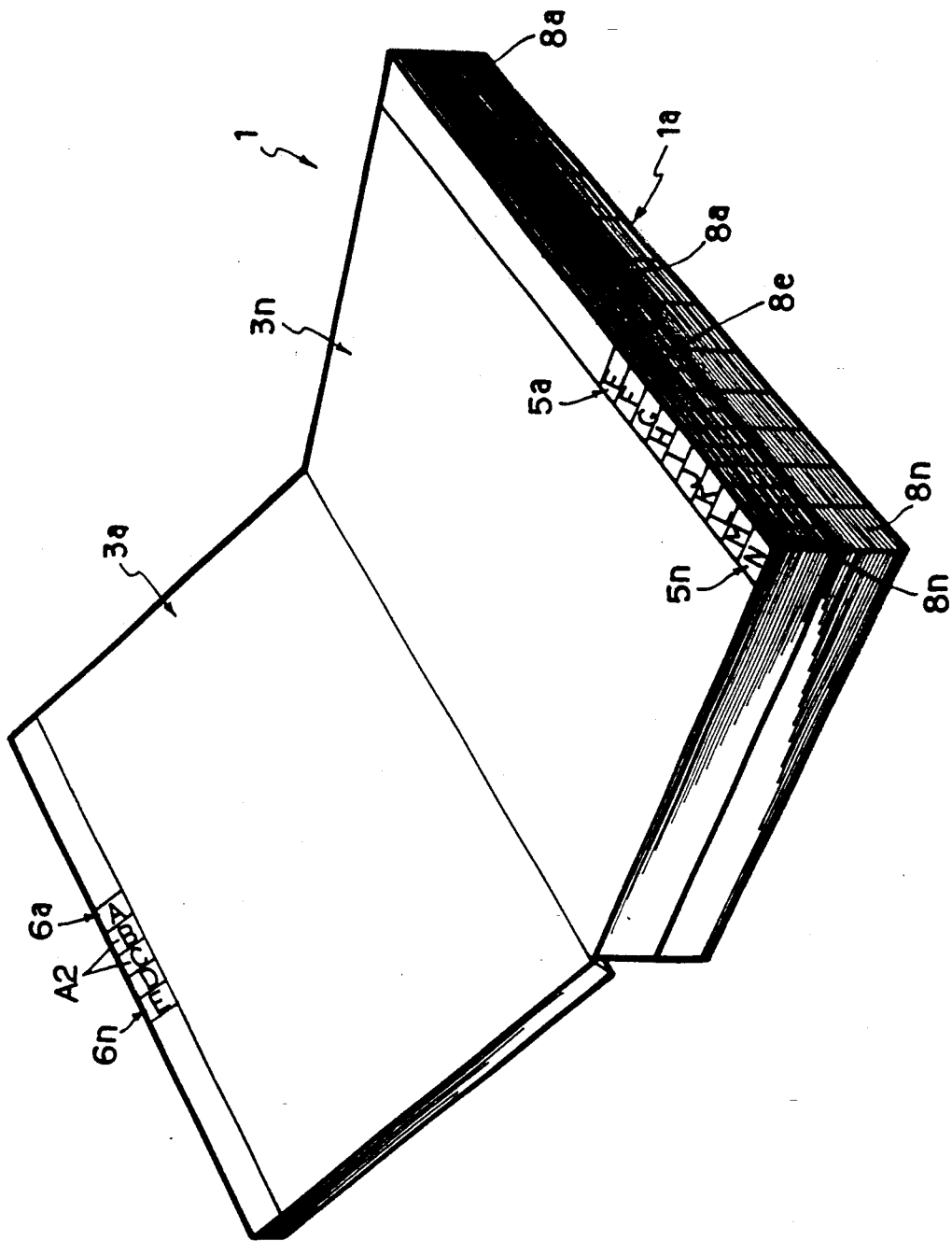
FIG. 2 is an opened perspective view of a combined pocketbook-atlas in accordance with another embodiment of this invention.
Figure 3:
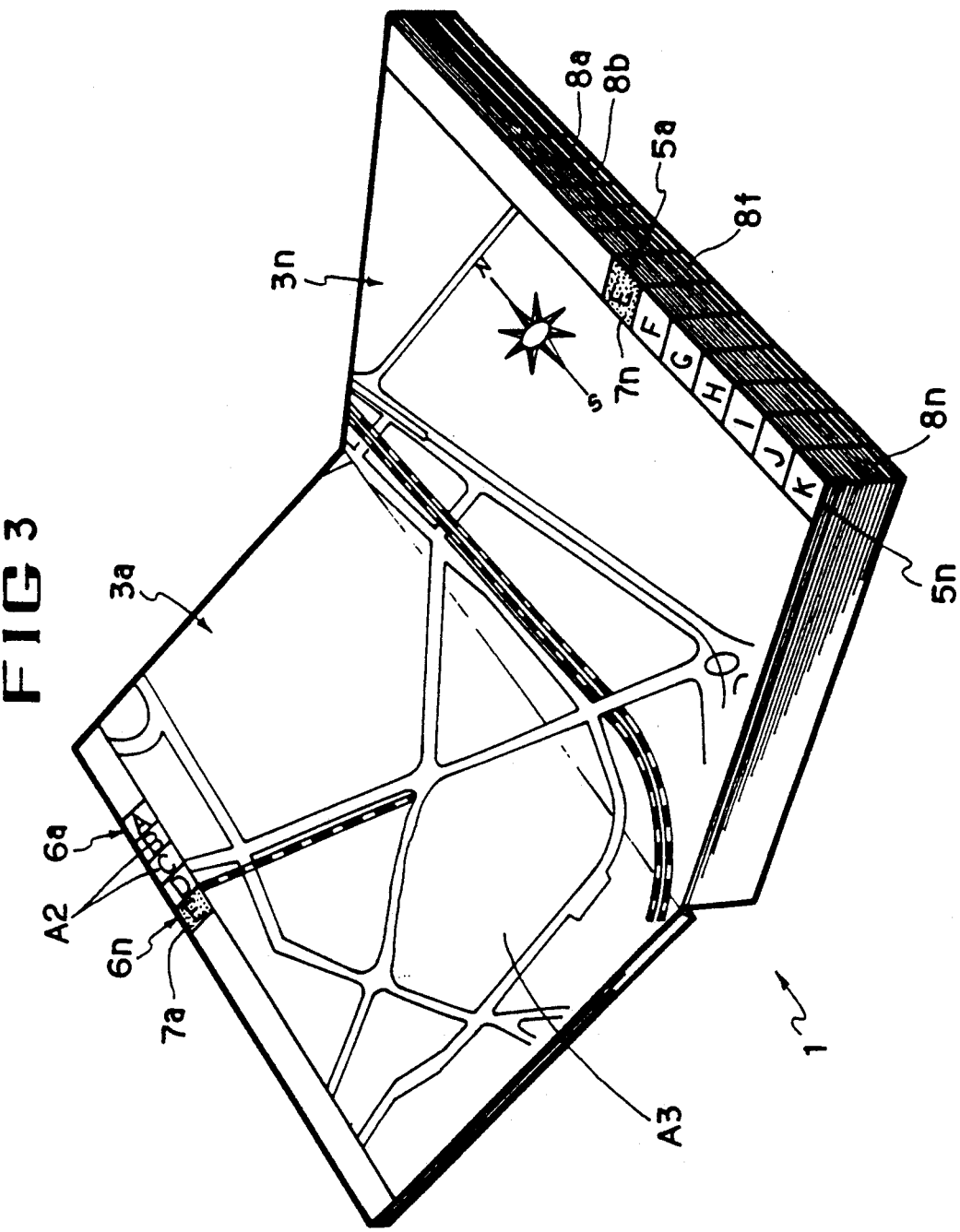
FIG. 3 is an opened perspective view of the atlas of FIG. 1 showing a map and light and deep colored front and back index blocks.

With reference to FIGS. 1 to 3, FIGS. 1 and 3 show an atlas 1 according to a first embodiment of this invention, respectively, while FIG. 2 shows an atlas 1 combined with telephone notes 1a according to a second embodiment of this invention. Such an atlas 1 having telephone notes 1a is conventionally named as a combined pocketbook-atlas. Of course, the present invention may be applied to various types of bound books and notebooks, such as telephone notes with no map, as well as the aforementioned atlas and combined pocketbook-atlas.

As shown in FIG. 1, the atlas 1 of this invention comprises front and back covers 2 and a plurality of inner papers 3a to 3n, the covers and inner papers being bound up into the atlas 1 in the same manner as the prior art. Like the conventional atlas, the inner papers 3a and 3n are printed with individual maps of subdivided districts of a region, said region being subdivided into several districts and, as a result, several maps for the subdivided districts constituting the atlas of the region.

The front cover 2 of the atlas 1 has a longitudinal side index part. This index part comprises a regional name section A1 which is located at an upper portion of the longitudinal side periphery of the cover 2 and printed with the name of region covering all of the subdivided maps of the inner papers 3a to 3n. Below the regional name section A1, a longitudinal index section for facilitating looking for a map to be desired is provided. This index section consists of a plurality of cover index blocks 4a to 4n which indicate individual maps of subdivided districts printed on the inner papers 3a to 3n. These index blocks 4a to 4n are printed with individual alphabets A2, for example, A, B, C, . . . and N, representing the subdivided districts and colored in different colors so as to be distinguishable from each other.

In coloring the cover index blocks 4a to 4n, the first index block 4a printed with the alphabet A is, for example, red colored, the second block 4b printed with the alphabet B is blue colored, the third block printed with the alphabet C is yellow colored and the fourth block printed with the alphabet D is violet colored.

Turning to FIG. 2 and 3, each of the inner papers 3a to 3n is provided with a set of front index blocks 5a to 5n and a set of back index blocks 6a to 6n. These sets of index blocks 5a to 5n and 6a to 6n are located at longitudinal sides of front and back surfaces of each inner paper, respectively, such that they align with the index blocks 4a to 4n of the front cover 2. The front and back index blocks 5a to 5n and 6a to 6n are colored in the same pattern as that of the index blocks 4a to 4n of the cover 2. As depicted in FIG. 3, a map of a subdivided district of the region is printed throughout a back page of an inner paper 3a and a front page of an inner paper 3n, said back and front pages facing to each other. Hence, when the atlas is opened, the map of the subdivided district appears as shown in FIG. 3. In order to cause prominent discrimination of these pages from the other pages when the map printed on these pages is required to look for, one index block 7n of the front index blocks 5a to 5n and one index block 7a of the back index blocks 6a to 6n are colored in a deep color while the other blocks are colored in light colors. For example, when the index block 4a of the front cover 2 is intended to be red colored as described above, all of the front and back index blocks 5a and 6a, aligning with the index block 4a, of the inner papers 3a to 3n are colored in a light red. However, the index blocks 7a and 7n of the inner papers on which the map A3 of the subdivided district represented by the index block 4a of the cover 2 is printed are colored in a deep red. In the same manner, when the index block 4b of the front cover 2 is intended to be blue colored, all of the front and back index blocks 5b and 6b of the inner papers 3a to 3n aligning with the index block 4b of the cover 2 are colored in a light blue. However, the blocks 7a and 7n of the inner papers, on which pages the map A3 of a subdivided district represented by the index block 4b is printed, are colored in a deep blue.

Such a coloring of the front and back index blocks 5a to 5n and 6a to 6n naturally makes the atlas 1 be provided with a plurality of differently colored indexes 8a to 8n on the longitudinal thickness surface of the atlas 1. These indexes 8a to 8n are shown as light colored when the thickness surface of the atlas 1 is look at the side under the condition that the atlas 1 is closed. However, when this atlas 1 is opened or deformed to let its thickness surface be inclined and enlarged, the deep colored blocks 7a and 7n, which have been indistinguishable from the others, are distinguishable, thanking for the tones of color, from the light colored blocks of a colored index 8a, 8b, . . . or 8n provided on the thickness surface of the atlas 1 and this facilitates looking for the pages on which the map A3 to be desired is printed.

The following example is merely intended to illustrate the present invention in further detail and should by no means be considered to limit the scope of the invention.

EXAMPLE

Front and back covers 2 and a plurality of inner papers 3a to 3n were bound up into an atlas 1 of FIG. 1. Of course, this atlas 1 might have been combined with the pocketbook 1a as shown in FIG. 2.

The front cover 2 of the atlas 1 was provided with a regional name section A1 which was located at an upper portion of the longitudinal side periphery of the cover 2 and printed with the name of region covering all of the subdivided maps of the inner papers 3a to 3n. Here, the atlas 1 was intended to cover subdivided maps of Seoul, Korea and, as a result, the regional name section A1 was printed with "Seoul" and colored. Below the regional name section A1, a longitudinal index section for facilitating looking for a map to be desired was provided. This index section consisted of a plurality of index blocks 4a to 4n which indicated individual maps of subdivided districts printed on the inner papers 3a to 3n. These index blocks 4a to 4n were printed with the individual alphabets A2, that is, district A, district B, district C, . . . and district N, representing the subdivided districts of Seoul and colored in red, scarlet, yellow, green, blue, violet and etc., respectively, so as to be distinguishable from each other.

In addition, each of the inner papers 3a to 3n was provided with a set of front index blocks 5a to 5n and a set of back index blocks 6a to 6n. These sets of index blocks 5a to 5n and 6a to 6n were located at longitudinal sides of front and back surfaces of each inner paper, respectively, such that they aligned with the index blocks 4a to 4n of the front cover 2. The front and back index blocks 5a to 5n and 6a to 6n were printed with alphabets A2 representing the subdivided districts of Seoul in the same pattern as that of the index blocks 4a to 4n of the cover 2, otherwise stated, these index blocks 5a to 5n and 6a to 6n were printed with district A, district B, district C, . . . and district N, respectively, and colored in red, scarlet, yellow, green, blue, violet and etc., respectively.

Here, the maps of subdivided districts were printed on the inner papers 3a to 3n such that a map A3 of the district E was printed throughout a back page of an inner paper 3a and a front page of an inner paper 3n, said back and front pages facing to each other, as depicted in FIG. 3. In this case, a back index block 7a and a front index block 7n of the inner papers 3a and 3n, both being printed with the alphabet E, were deep colored while the index blocks 7a and 7n of the other inner papers were light colored, thereby causing these papers 3a and 3n to be prominently distinguished from the other inner papers. Here, since the fourth index block of the cover 2 printed with the alphabet E representing the district E was colored in blue as described above, the index blocks 7a and 7n of the papers 3a and 3n were colored in deep blue while the index blocks 7a and 7n of the other papers were colored in light blue. Such a blue coloring of the front and back index blocks 7a and 7n of the inner papers 3a to 3n naturally made the atlas 1 be provided with an index 8f colored in light blue when the thickness surface of the atlas 1 was looked at the side under the condition that the atlas 1 was closed. When the other front and back index blocks of the inner papers 3a to 3n were colored by different colors in the same manner as described above, the atlas 1 was provided with a plurality of light colored indexes 8a to 8n on its longitudinal thickness surface such that the first index 8a was colored in light red and the second index 8b was colored in light scarlet.

In looking for a map of a subdivided district to be desired using this atlas 1, an index block 4a, 4b, . . . or 4n of the cover 2 representing the desired district was selected. The atlas 1 was, thereafter, opened or deformed to let its thickness surface be inclined and enlarged. Hence, the deep colored blocks 7a and 7n were distinguishable from the light colored blocks of the colored index 8a, 8b, . . . or 8n provided on the thickness surface of the atlas 1 and this facilitated looking for the pages on which the map to be desired was printed. In order to look for another map during referring to the previously selected map, the atlas 1 was deformed in the same manner as described above and this allowed the deep colored blocks to be distinguishable from the light colored blocks of a colored index 8a, 8b, . . . or 8n. Thereafter, simple finding of the pages having the deep colored blocks achieved looking for the map to be desired. In this regard, looking for the map to be desired using the present atlas was simply and rapidly carried out.

Figure 4:
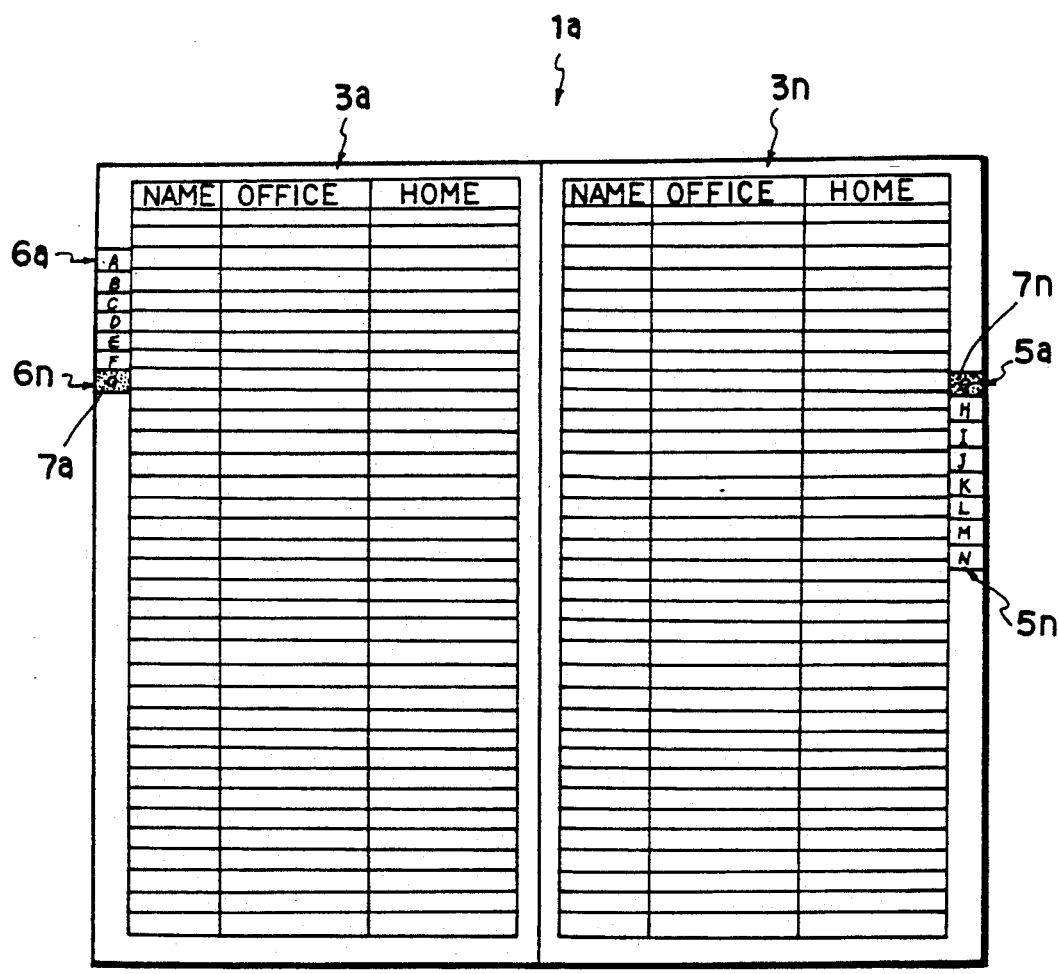
FIG. 4 is a plan view of an opened pocketbook according to still another embodiment of this invention.

On the other hand, the present invention was applied to a telephone pocketbook 1a which consisted of front and back cover 2 and 30 inner papers 3a to 3n and had no map. This telephone pocketbook 1a is depicted in FIG. 4. The index blocks of this telephone pocketbook 1a were printed with different alphabets and colored by different colors such that the seventh index block of the front cover 2 was colored in green and printed with the alphabet "G". In addition, let the memory part corresponding to the alphabet G be prepared on 15-16 pages of the pocketbook 1a. In this case, the front and back index blocks 5a and 6n of the inner papers 3a to 3n aligning with the seventh index block colored in green were colored in light green except for the index blocks 5a to 3n of 15-16 pages. These index blocks 5a and 6n of 15-16 pages were colored in deep green. Such a green coloring of the front and back index blocks 5a and 6n of the inner papers 3a to 3n naturally made the pocketbook 1a be provided with a side index colored in light green. In looking for pages to be desired, the pocketbook 1a was opened or deformed in the same manner as the aforementioned atlas 1. Hence, the deep colored blocks 5a and 6n were distinguishable from the light colored blocks and this facilitated looking for the pages of the pocketbook 1a to be desired.

As described above, the atlas of this invention allows the user to easily find pages, on which individual maps to be desired are printed, thereby providing an advantage in that the user looks up several subdivided districts of a region as if he used a complete map of the region printed on a paper of about 5 m×5 m. In addition, the atlas of this invention is provided with page indexes on its front cover and front and back indexes on individual inner papers, the page indexes and front and back indexes being colored in light and deep colors, thereby prominently discriminating pages to be desired from the other pages by the different colors and, in this regard, allowing the user to look up a place to be desired therein more simply and rapidly. Hence, this atlas has no table of contents and does not require to be printed with page numbers unlike the conventional atlas and this simplifies the structure of the atlas and reduces manufacturing cost.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An atlas comprising:
   a plurality of inner papers each having a map printed thereon; and
   a front cover having a regional name section and a plurality of cover index blocks, said plurality of cover index blocks being colored in different colors so as to be distinguishable from each other, each of said different colored cover index blocks corresponding with at least one of said maps printed on said plurality of inner papers;
   each of said inner papers having a set of front index blocks and a set of back index blocks positioned on the front and back surfaces of each of said plurality of inner papers, respectively, said sets of front and back index blocks having the same size as said plurality of cover index blocks and being aligned with said plurality of cover index blocks when the atlas is in a closed position, said sets of front and back index blocks being colored in said different colors so that the cover, front and back index blocks having the same color are aligned with one another when the atlas is in the closed position, at least one of said front index blocks and at least one of said back index blocks on each inner paper being colored in a distinguishable shade of color relative to the other of said front and back index blocks with which said at least one of said front and back index blocks is aligned.

2. The atlas of claim 1 wherein:
   each of said plurality of inner papers have substantially the same shape.

* * * * *